United States Patent Office 3,302,614
Patented Feb. 7, 1967

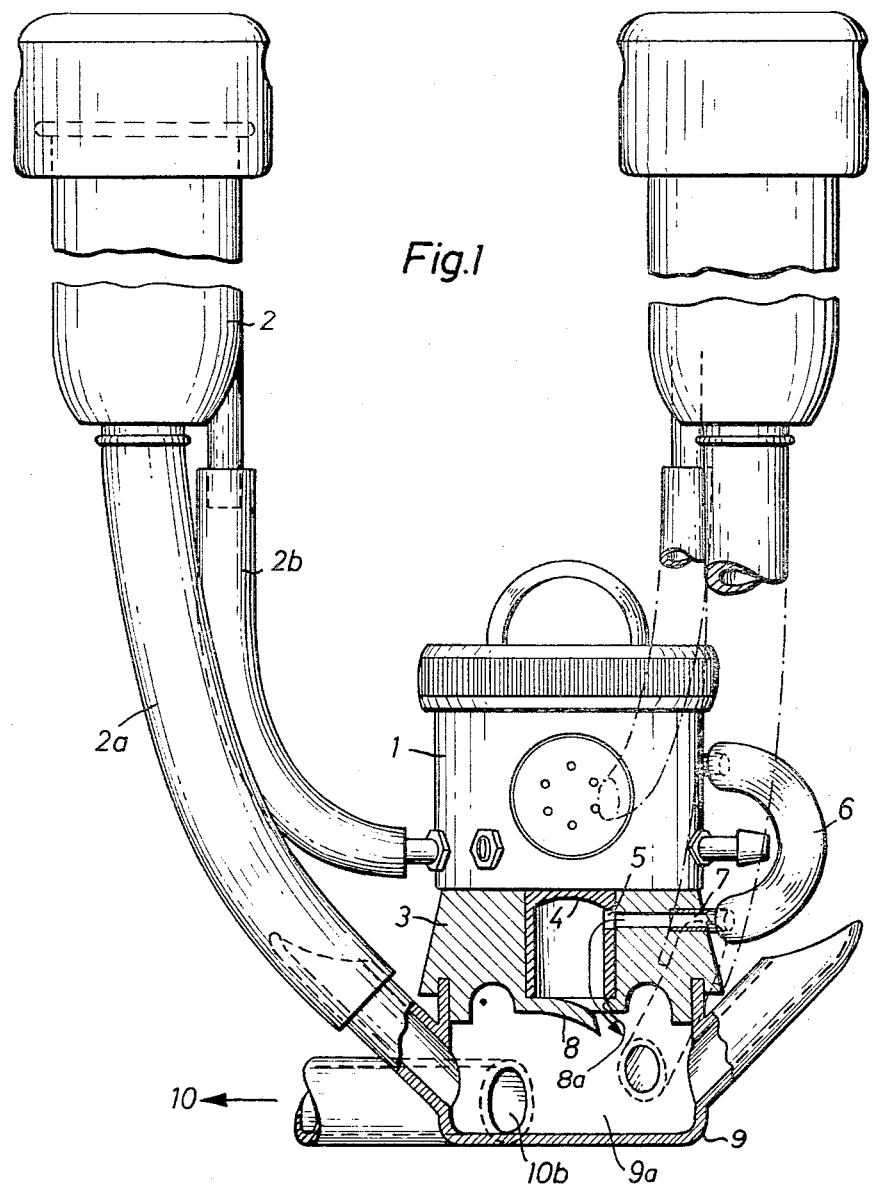

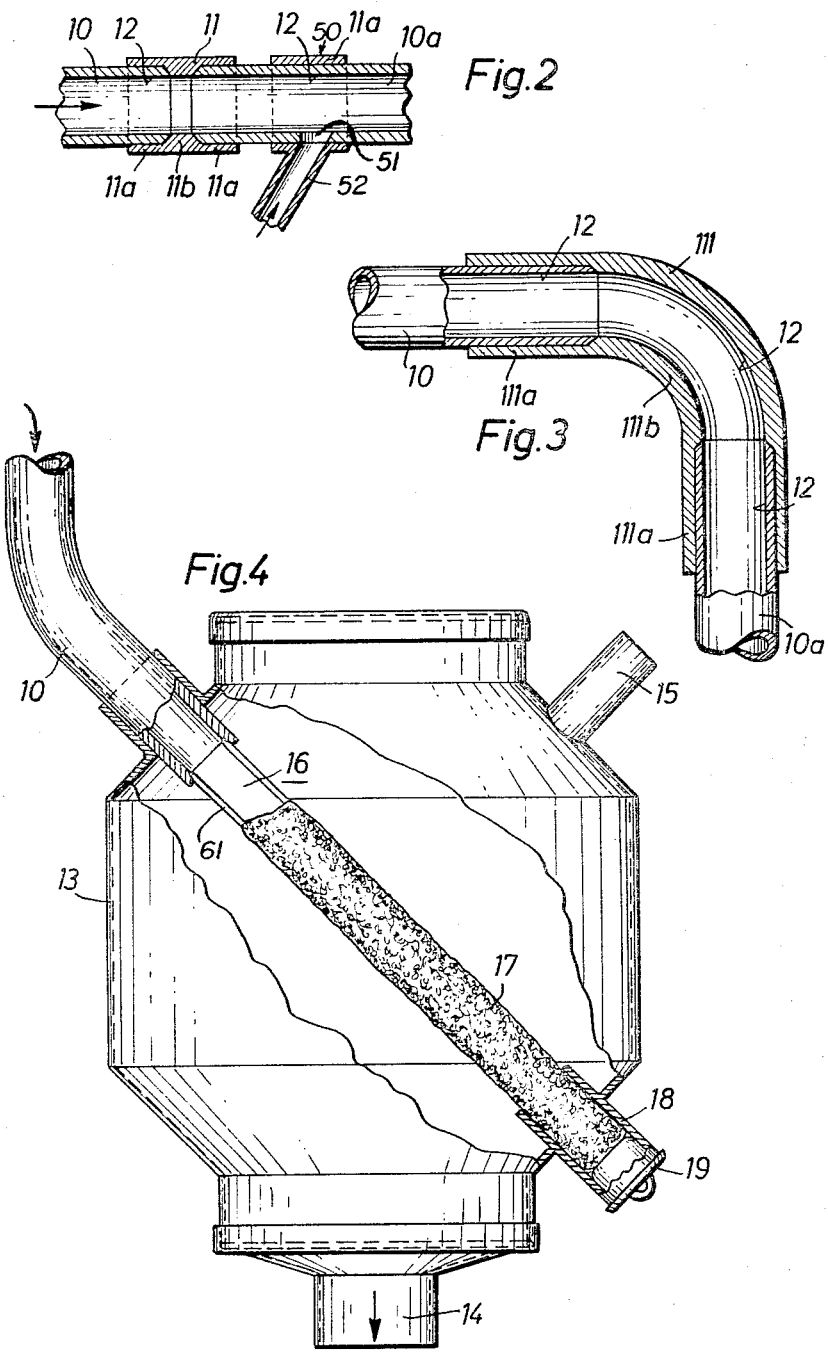

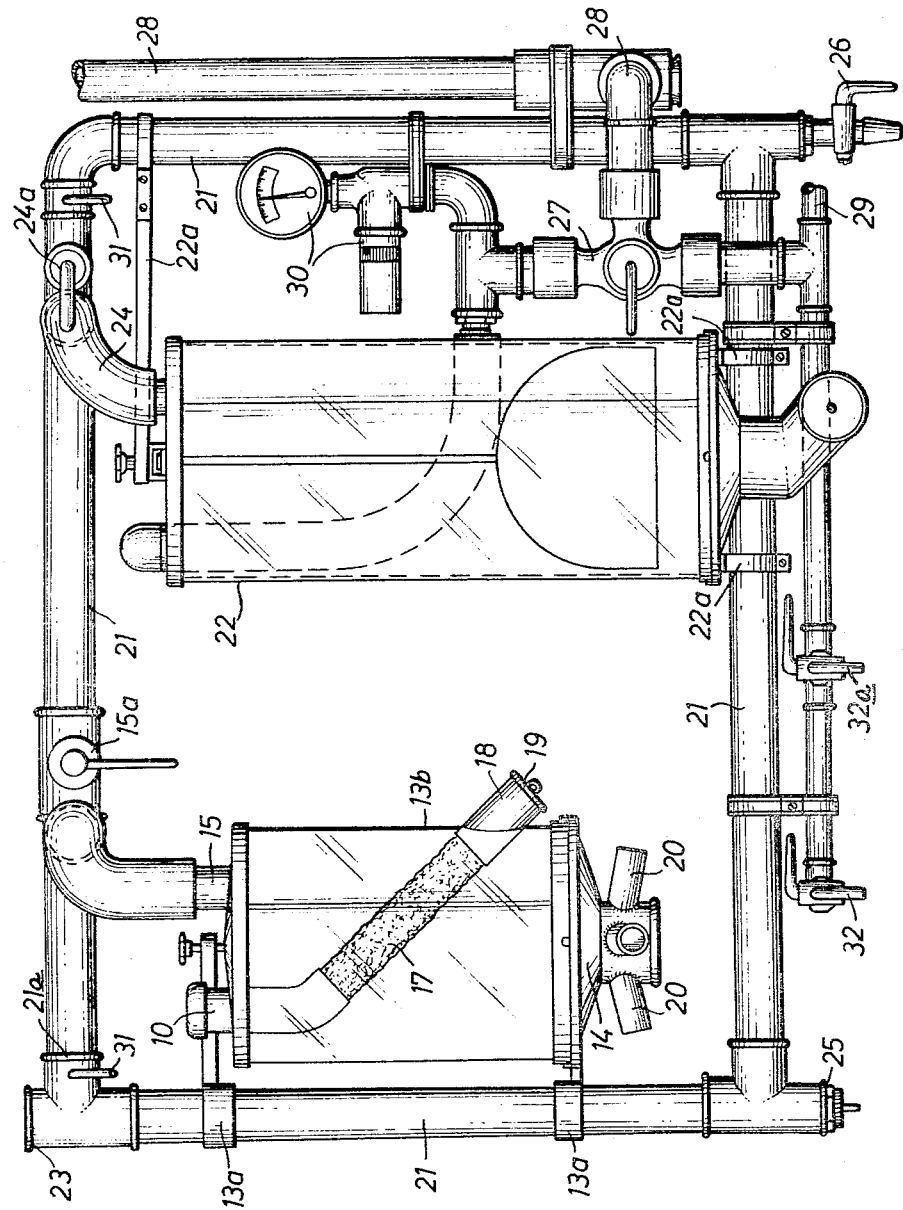

3,302,614
MILKING MACHINE
Günther Karnath, Eschenhahn, Taunus, Germany, assignor to Kurt Karnath, Wiesbaden, Germany, Günther Karnath, Eschenhahn, Taunus, Germany, and Max H. Hoepli, New York, N.Y.
Filed July 21, 1965, Ser. No. 475,321
Claims priority, application Germany, Mar. 3, 1965,
K 55,433, K 55,537
10 Claims. (Cl. 119—14.36)

The present invention relates to milking machines, and more particularly to milking machines having only a single flexible tube or pipe conduit for the removal of both milk and suction air entrained therein.

In recent years the use of automatic suction milking machinery having only one flexible tube or pipe conduit for milk and suction air has become firmly established in the agricultural industry. Extremely useful apparatus has been developed, e.g. pulsator units, filter installations, cooling arrangements, washing appliances, decanting devices, and so forth. It has, however, been found in practice that these devices are still not yet equal to all the requirements arising in rough farming operation. One main reason is that the apparatus quickly becomes soiled and needs therefore to be washed through at frequent intervals and also to be taken apart often so that each component can be thoroughly cleaned. Another drawback is that these known devices exhibit a relatively poor efficiency, and moreover a continual fluctuation in the low-pressure is to be observed, making frequent readjustment necessary.

It is an object of the present invention to eliminate the disadvantages just referred to.

Briefly, according to the present invention, the entire hose and tube system of the milking plant is so arranged that milk residues cannot settle or set up eddies in the piping or tubing; and a check valve is placed in the pulsator to control milk flow close to the source and prevent any milk from reaching the interior of the pulsator unit. It is also advantageous to withdraw the entrained moisture from the thin air flowing back into the suction pump. The entire milk-air conduit from the inlet aperture as far as the outlet for the milk has a smooth internal wall of unvarying equal cross-section. The outlet, of equal cross-section, is constructed as a filter cage and arranged to be suspended freely in a vacuum container so that milk is drawn out from the filter unencumbered by filter structural elements. The milk passes from the vacuum container through a connection, for decanting, while the thin air is sucked from the upper part of the same vacuum container. The air passes through a connection into a vacuum tube frame having at least two vertical tube parts to permit moisture to be drawn off by gravity.

The structure, organization and operation of the invention will now be described more specifically in the following detailed description with reference to the accompanying drawings, in which:

FIGURE 1 shows the pulsator, partly in section, and milking cups;

FIGURES 2 and 3 show the construction of the pipe itself;

FIGURE 4 shows a vacuum separator to separate milk and thin air; and

FIGURE 5 shows the construction of the vacuum pipe with condensate extraction and a different form of vacuum separator.

Referring now to the drawings:

FIGURE 1 shows the milking apparatus with the customary pulsator 1 and milking cups 2 with the milk conduits 2a and air conduits 2b. The pulsator 1 carries on its lower surface an air or antechamber 4. The atmospheric air arriving from the pulsator passes by way of the flexible tube piece 6, connection 7 and bore 5 into the antechamber 4. A solid elastic intermediate piece 3 is pushed onto the housing of the antechamber 4. The milk collecting unit 9, having a milk-air collecting chamber 9a is fastened to piece 3. The milk from the teat cups flows into the collecting unit chamber 9a by way of the flexible tubes 2a and then on out through the milk-air conduit 10. A negative pressure is set up in the usual way in conduit 10 by means of a suction pump (not shown), so that the arriving milk together with atmospheric air coming from the pulsator is sucked off through the aperture 10b in the collecting unit 9, atmospheric air following thereafter continuously through the antechamber 4 in the rhythm of the pulsator. It is important that milk is prevented from penetrating into the pulsator through the antechamber 4 and flexible tube 6 owing to any backwash in the conduit 10, because this would necessitate the complicated and time consuming job of taking apart the pulsator itself and cleaning all its component parts. Soiling might happen too if, as often happens, the milking gear drops off the udder. It has been attempted to evade the latter mishap by the proposed expedient of incorporating directly on the collecting piece, a cut-off member in the milk-air conduit which shuts on impact with the ground in falling down. But it has been found that such contrivances seldom work in practice, and then only if the milking gear actually drops vertically downwards, thus striking on the handle of the cut-off member. According to the present invention, the antechamber 4 is separated from the milk collecting unit chamber 9a by a check valve 8 shown open in FIG. 1. So long as a lower pressure prevails in the collecting unit chamber 9a than in the antechamber 4 the valve 8, which in the present example of construction is represented as a flap valve formed of an elastic flap of the same material as intermediate piece 3, for example, plastic or rubber, remains open. But as soon as, for whatever reason, a backwash and hence pressure equilization occurs in the chambers 4 and 9a, the flap of valve 8 closes through its own elasticity and a built-in bias to close. Obviously, membrane valves, ball valves or other types of valve can be used in this arrangement. Advantageously, the entry chamber 4 is beveled, as at 8a, and the flap is made with a matching bevel to provide for a tight seal. The connection of the pulsator unit may be round; the flap 8a then may be a three-quarter circle.

The milk-air conduit 10 has an entirely smooth inner wall of constant equal cross-section. For this purpose, and referring to FIGURES 2 and 3, at all points where there are butt joints, bends, connections or attachments, or intermediate connection pieces 11, 111 are inserted between the adjoining pipe ends 10 and 10a. These intermediate pieces embrace the ends of the two pipes 10 and 10a by means of sleeves 11a, 111a. The middle part 11b, 111b of the intermediate pieces engages between the two pipe ends and has the same internal diameter as they have. The end faces of the pipe ends are chamfered and fit flush against the middle part 11b, 111b of the intermediate piece. In this way, at such points of connection the effect of a continuously smooth internal wall 12 is obtained, such as to prevent any possibility of sedimentation of eddy formation. Even the supply from multiple milking apparatus, as seen in FIGURE 2, can be kept smooth in the same way. A coupling element 50, of outer diameter 11a, is placed over pipe 10, formed with an aperture 51. Inlet 52 is aligned with aperture 51 thus causing a minimum of disturbance in the flow in tube 10.

The milk-air mixture arrives without resistance at the end of the milk-air pipe 10, shown in FIGURE 4. At this point the pipe enters a vacuum separator or container 13 and terminates close behind its wall. A filter cage 16 is pushed into the end of the pipe 10 and extends transversely, preferably obliquely downward across container 13. It consists in the present example of individual axially-parallel bars 61. The end of said cage engages on the opposite side of the container 13 in a tubular sleeve 18, is there sealed off by a plug 19 and thus also secured in position. The plug may also be in the form of a screw nipple and press the cage 16 by means of a spring against the pipe 10. This filter cage is jacketed in the customary way with a filter wadding 17. The filter 16, 17 may be arranged horizontally or obliquely in the vessel 13. The important factor is that it is surrounded over its entire surface by air under vacuum. The inflowing milk does not only pass by virtue of its own weight through the filter, but rather it is sucked through over the entire filter surface. All particles of dirt, etc. however collect in the lowest part of the filter, which lies in the pipe connection 18. After removal of the closure plug 19 the filter can easily be exchanged without the necessity of dismantling any other parts of the unit. The filtered milk then flows through the discharge connection 14, if desired after being cooled, and is passed on to be decanted. At the same time, the suction air entrained in the pipe 10 is drawn off through the connection 15 and passes, as shown in FIGURE 5, through a flexible hose into the pipe 21 and must there flow off towards the right (in FIGURE 5), because the pipe on the other side is closed by a blind flange 21a. The pipe 21 now extends in the shape of a rectangle or square which must be traversed in its whole length by the suction air in order to reach the suction connection 23 of the suction pump, not shown in the drawing. This tubular frame 21 may be suspended as a unit on the milk chamber wall by lugs 31 or mounted upright in an appropriate chassis. The suction air, still warm from the milk, cools on its relatively long path through the pipe 21 to the pump connection 23, so that the condensate settles on the inner walls of the pipe. On the two vertival tube sections the condensate flows downwards and can be discharged through drip valves or cocks 25, 26. The air flowing back into the pump connection 23 is accordingly practically free from moisture vapors, so that the pump itself has a considerably longer useful life without servicing. The special frame shape of the vacuum tube 21 at the same time affords the possibility of securing the vacuum vessel 13b pivotably by means of mounting supports 13a to one vertical tube piece 21. The flexible connecting tube between the connection 15 and the tube 21 is for this reason supple and adequately long. In operation, the vessel 13b is rocked forward, so that the milk can be decanted through the run-off 14 and connections 20 into the transport container. At the other vertical end of the tube 21 an ordinary washing vessel 22 is fastened by means of supports 22a. This is connected through a flexible tube piece 24 likewise with the pipe 21. Furthermore, a water pipe 29, three-way valve 27, fittings 30, valves 32, 32a, and a rinse pipe 28 may be mounted on the tube frame 21. The three-way cock 27, cocks 15a and 24a, rinse pipe 28 and water taps 32 are used for rinsing and washing the installation and are shown in the drawing for the sake of completeness; they may be used to connect rinse water to the milking system, as is shown, when the system is to be washed. Through the invention the efficiency of the installation is increased, the working life of the pump is prolonged and, above all, the cleaning of the installation is simplified and substantially accelerated. The filter 17 which needs most frequent attention and replacement is accessible through plug 19 (FIGURE 4) which is so mounted as to be removable from the outside of vessel 13b.

I claim:

1. Milking machine having a pulsator unit including an atmospheric air intake, an air chamber connected thereto, and a milk-air mixture chamber in communication with said air chamber; a check valve located between said air chamber and said milk-air chamber to permit air to enter from said air chamber into said milk-air chamber and block flow of milk and air mixture into said air chamber; outlet means connected to said milk-air chamber, said outlet means having smooth interior walls to prevent accumulation of milk residue as the milk-air mixture passes therethrough; and milk-air separating means including a vacuum vessel, connected to said outlet means, said vacuum vessel having a milk filter located therein to remove the milk from said milk-air mixture by drawing the milk-air mixture through the filter within the vacuum chamber and to separate the milk from the air within the vessel.

2. Milking machine as set forth in claim 1 including means to remove air from said vacuum vessel, said means comprising an outlet arranged at the upper part of said vessel, and a tubing frame having at least a pair of interconnected vertical tube parts connected to said outlets; and means withdrawing air from the upper part of one of said vertical tube parts, whereby moisture within the air being withdrawn will condense at the side walls of said vertical tube parts prior to withdrawal from the milking machine.

3. Milking machine as set forth in claim 1 including means removing air from said vacuum vessel, said means comprising a rectangular, vertically arranged frame assembled of tubing having a pair of substantially horizontally extending tubes and a pair of upright tubes; a fluid blocking means arranged in the upper horizontal tube and dividing said tube into a pair of sections; means introducing air from said vacuum vessel into one of said sections, whereby air will travel horizontally and then downwardly, then horizontally again and then upwardly through said frame.

4. Milking machine as set forth in claim 3, wherein said vacuum vessel is suspended from one of said upright tubes.

5. Milking machine as set forth in claim 1, wherein said check valve is a flap valve of resilient material biased towards closing position.

6. Milking machine as set forth in claim 5, wherein said check valve is of a material integral with the material of the pulsator surrounding said chamber.

7. Milking machine as set forth in claim 1, wherein said outlet means include tubing elements and connecting parts, said connecting parts having sleeves engaging over said tubing elements, said tubing elements and said connecting parts having equal internal diameter and forming tight butt joints therewith to present a smooth inner wall to the flow of milk-air mixture.

8. Milking machine as set forth in claim 1, wherein said milk filter is a cage arranged transversely within said vacuum vessel and connected to said outlet means, and filter material surrounding said cage.

9. Milking machine as set forth in claim 8, wherein said cage is slanted obliquely downward within said vessel; a plug closing said cage located at the lower end thereof and removable from the outside of said vacuum vessel.

10. In a milking machine having a pulsator formed with an atmospheric air chamber and a milk-air mixture chamber, a vacuum vessel, and connection means from said milk-air chamber to said vacuum vessel; means to prevent accumulation of milk at undesired places within said machine, said means comprising a flap valve separating said chamber and said milk-air mixture chamber; tubing having connecting pieces interconnecting said milk-air mixture chamber and said vacuum vessel and characterized by a smooth interior surface; and milk-air separating means within said vacuum vessel including a cage and filter assembly located within said vessel and extending transversely thereof to provide for removal of milk-air mixture from said cage by under pressure at the outside thereof, for gravity separation of milk and air within said vessel.

References Cited by the Examiner

UNITED STATES PATENTS

| | | | |
|---|---|---|---|
| 1,111,562 | 9/1914 | Burrell | 119—14.46 |
| 2,237,444 | 4/1941 | McCornack | 137—103 |
| 2,677,348 | 5/1954 | Domingo | 119—14.46 |
| 2,755,769 | 7/1956 | Larson | 119—14.46 |
| 2,869,512 | 1/1959 | Merritt et al. | 119—14.46 |
| 2,869,573 | 7/1959 | Schalm et al. | 119—14.36 |
| 2,982,247 | 5/1961 | Varese et al. | 119—14.11 |
| 3,139,856 | 7/1964 | Lippke | 119—14.36 |
| 3,139,857 | 7/1964 | Merritt et al. | 119—14.46 |

SAMUEL KOREN, *Primary Examiner.*

ALDRICH F. MEDBERY, *Examiner.*